United States Patent [19]
Faisant

[11] Patent Number: 5,634,612
[45] Date of Patent: Jun. 3, 1997

[54] EARTH ORBITING SATELLITE HAVING ELECTRICAL ENERGY STORAGE BATTERIES

[75] Inventor: Pierre-Philippe Faisant, Portet sur Garonne, France

[73] Assignee: Matra Marconi Space France, Paris, France

[21] Appl. No.: 319,538

[22] Filed: Oct. 7, 1994

[30] Foreign Application Priority Data

Oct. 8, 1993 [FR] France ................... 93 12035

[51] Int. Cl.⁶ .................. B64G 1/44; B64G 1/22; B64D 33/10
[52] U.S. Cl. ............... 244/158 G; 244/57; 244/173
[58] Field of Search ............ 244/158 R, 158 G, 244/57, 173

[56] References Cited

U.S. PATENT DOCUMENTS

| 3,830,663 | 8/1974 | Eisele et al. ............ 136/166 |
| 4,580,748 | 4/1986 | Dalby ..................... 244/158 |
| 4,735,382 | 4/1988 | Pinson .................... 244/173 |
| 5,310,141 | 5/1994 | Homer et al. ......... 244/158 R |

FOREIGN PATENT DOCUMENTS 0241333  10/1987  France ................ 244/158 A

OTHER PUBLICATIONS

Journal of Powersources – vol.18, No. 2–3, Sep. 1986, Lausanne, CH–pp. 245–258–Metcalfe, J. "Lightweight, Direct–Radiating Nickel–Hydrogen Batteries" – whole document –.

21st Intersociety Energy Conversion Engineering Conference vol. 3 Aug. 29, 1986, San Diego, California, USA pp. 1541–1546? Wong et al. "Intelsat VI Nickel–Hydrogen Battery"–Whole document.

*Primary Examiner*—Andres Kashnikow
*Assistant Examiner*—Virna Lissi Mojica
*Attorney, Agent, or Firm*—Larson & Taylor

[57] ABSTRACT

A three axis stabilized geostationary satellite comprises a structure having walls that face North and South when the satellite is on station and carrying at a storage battery of large capacity. The storage battery is constituted by cells mounted on a chassis having a base plate oriented North-South and mechanically secured to sides that face North and South when the satellite is on station. The sides carry thermal radiators that are thermally connected to each other and to the cells. Typically sides are in alignment with North and South faces of the structure and extend away from the Earth.

11 Claims, 4 Drawing Sheets

EARTH ORBITING SATELLITE HAVING ELECTRICAL ENERGY STORAGE BATTERIES

BACKGROUND OF THE INVENTION

The present invention relates to satellites having a payload and designed to be stabilized on station about three axes on a geostationary orbit, such a satellite comprising a structure having walls that face North and South when the satellite is on station and carrying a storage battery of large capacity.

On most satellites, it is necessary to provide one or more storage batteries making it possible to provide useful power as required by the payload and by the units for stabilizing the satellite whenever its normal power generators are inoperative, as occurs, for example, whenever the satellite passes into the shadow of the earth.

Such storage cells, which are heavy components, are at present mounted on the structure of the satellite in several different ways. Such mountings must take constraints into account. In particular, storage cells provide satisfactory operation only over a determined range of temperatures. To satisfy this necessity, storage cells have already been connected to thermal radiators and equipped with electrical heater means controlled by regulation circuits.

Various practical dispositions have been used. One common solution consists in splitting up the storage cells into two batteries, each having two independent blocks on the inside face of the same wall (North or South) and having radiators that are carried by said wall. One of the two blocks is placed in the proximity of the East face of the structure while the other is in the proximity of its West face.

That disposition presents drawbacks. Since each block is independent, it must be connected to the other block of the same battery by conductors which are carried by the structure of the satellite, such that the two blocks cannot be connected together until they have been mounted on the satellite. Installation and removal of the batteries requires other elements of the satellite to be removed such as its solar generator, which makes the operation complex and risky, particularly prior to installation on a launcher. The surface area of the radiator and the power of the thermal control means must be sufficient to keep each block beneath its upper limit temperature when the radiator is in the sun and above its lower limit temperature when the radiator is in the shade. This means that the radiators must be given a large area (thereby taking up space on the North and South walls which are required to carry other dissipative elements), and to provide electrical heating at high power. Since the batteries are concentrated against the North and South walls, they occupy a large area reducing the area that remains available for other dissipative electronic equipments, such as travelling wave tubes for a telecommunication satellite.

SUMMARY OF THE INVENTION

An object of the present invention is to provide an improved satellite of the above-defined kind. More particularly, it is an object to provide a satellite whose storage cells are mounted in such a manner as to require a radiating area and heater power that are smaller than in the above-mentioned arrangement.

To this end, the invention provides in particular a satellite whose storage battery (or each battery) is constituted by cells mounted on a chassis having a base plate oriented North-South, mechanically secured to sides that face North and South when the satellite is on station, said sides carrying or constituting thermal radiators that are thermally connected to each other and to the cells.

By means of this disposition, the radiative surface area requirement for evacuating a given amount of heat is reduced because one of the radiators is always in shadow; this makes it possible to reduce heating power requirements considerably, in particular at the time of solstice, the radiator which is in shadow benefiting from sun light falling on the opposite radiator.

The radiators may normally be connected to each other and to the cells by heat pipes of conventional structure, comparable to those used, for example, to connect active elements placed inside the satellite to external radiators. The electrical heater elements may be of conventional structure, but fewer in number than in prior dispositions.

The invention also offers the possibility of facilitating installation and removal of a battery. To do that, according to a disposition that is advantageously usable in combination with the preceding dispositions, but that could be used independently, the chassis and the cells constitute a module that can be handled as a block, having side walls that are provided with means for fixing to the North and South walls and having a base plate provided with means for fixing to a plate belonging to the structure and placed in a plane that contains the North-South direction and the East-West direction. The module can then be installed by simple mechanical operations only together with plugging of electrical connectors carried by the module to electrical connectors terminating cables mounted on the structure of the satellite.

The invention will be better understood from the following description of particular embodiments thereof given as non-limiting examples. The description refers to the accompanying drawings.

DETAILED DESCRIPTION

Figure 1:
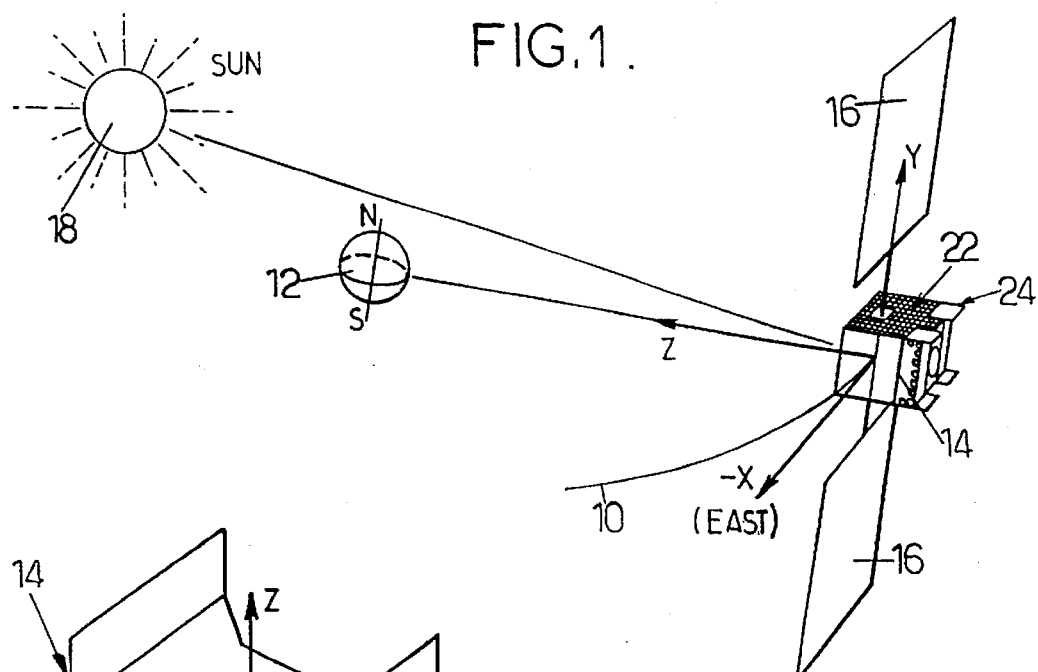
FIG. 1 is a diagram showing the general organization of a geostationary telecommunication satellite and one possible way of mounting its batteries in compliance with a particular embodiment of the invention.

The satellite whose general structure is shown in FIG. 1 is designed to be placed on a geostationary equatorial orbit 10 around the earth 12. It is stabilized about the X axis (East-West or roll axis), about the Y axis (North-South or pitch axis), and about the Z axis (yaw axis). It comprises a structure 14 on which solar panels 16 can rotate about the Y axis, parallel to the axis of rotation of the earth, so as to remain oriented towards the sun 18.

Figure 2:
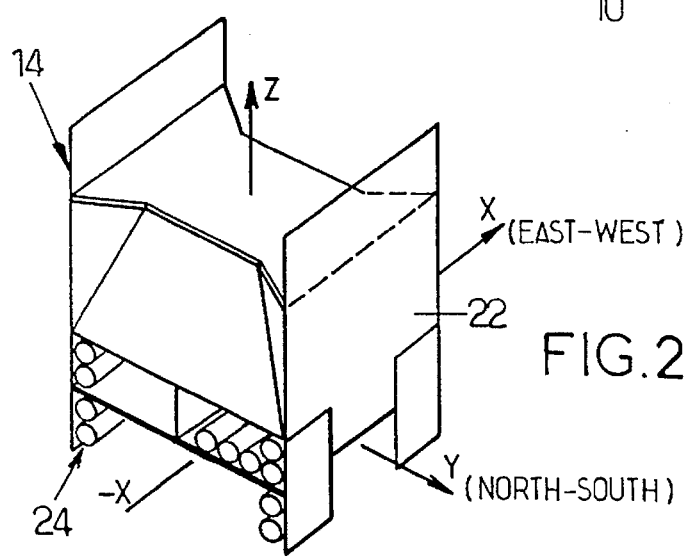
FIG. 2 is a diagrammatic perspective view of one possible satellite structure suitable for being fitted with batteries in compliance with a particular embodiment of the invention.
Figure 3:
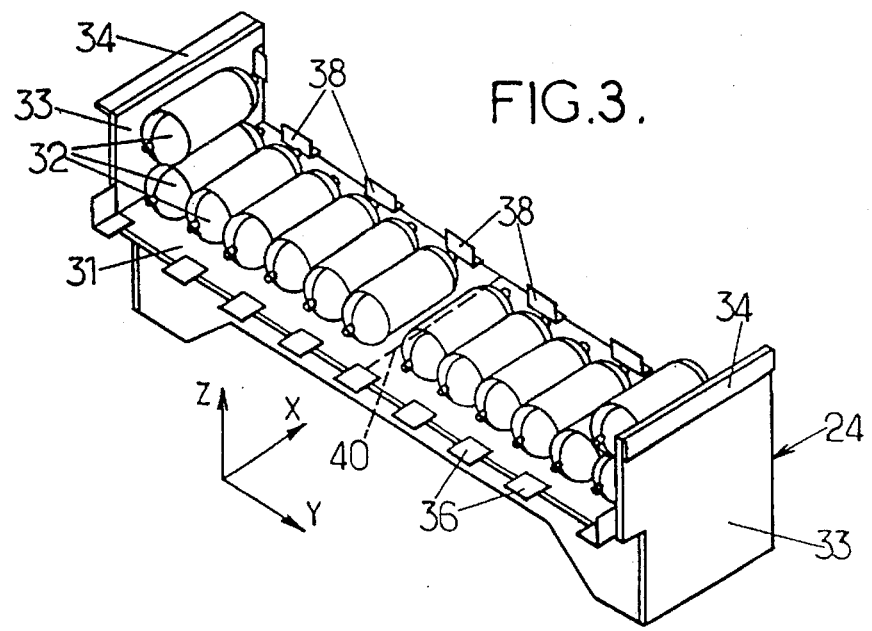
FIG. 3 is a perspective view of a module usable on the structure of FIG. 2 and seen in direction +X.

The structure 14 may be generally as shown in FIG. 2. It then comprises a platform on which the antennas are fixed, and walls 22, generally of honeycomb panels. Nozzles (not shown in FIG. 2) serve to keep the satellite on station and to stabilize it.

In the embodiment shown in FIGS. 3 to 6, the satellite structure 14 is designed to be connected to the adapter of a rocket for putting it onto a transfer orbit by means of a cone 26 (FIG. 6) surrounding the nozzle 27 of an apogee motor that, like the nozzles for keeping station, can be fed from propellent tanks 28. The weight of these tanks is transferred to the cone by links 30.

Still in the embodiment of FIGS. 3 to 6, the structure 14 is designed to receive two battery modules 24 disposed symmetrically about midplane YZ. Each module comprises a chassis constituted by a base plate 31 which will generally be constituted by a machined part or by a honeycomb panel, extending accross the entire width of the satellite in the Y direction, together with sides 33 (FIG. 3) that are generally constituted by honeycomb panels. When the module is installed, these sides are in alignment with the North and South walls away from the earth from the wall edges, thereby leaving the face that faces the earth free to receive payloads. These storage batteries are made up of cells 32 that are generally cylindrical in shape. In the embodiment of FIGS. 3 to 6, they are fixed flat against both sides of the base plate and against the inside faces of the sides.

This structure makes it possible to secure the chassis in a robust manner without overhang. The sides 33 can be provided with fixing flanges 34 for securing to the North and South walls. The base plate of the chassis may be provided with fixing tabs 36 for fixing to a plate that forms a part of the structure and that lies in an XY plane. The base plate may further be provided with fixing brackets 38 for fixing to the East and West walls (in the X and −X directions). It is even possible to provide an additional connection between the structure of the satellite and the base plate 31 via a separating partition that bears along the midline 40 shown in dash- lines in FIG. 3.

Figure 4:
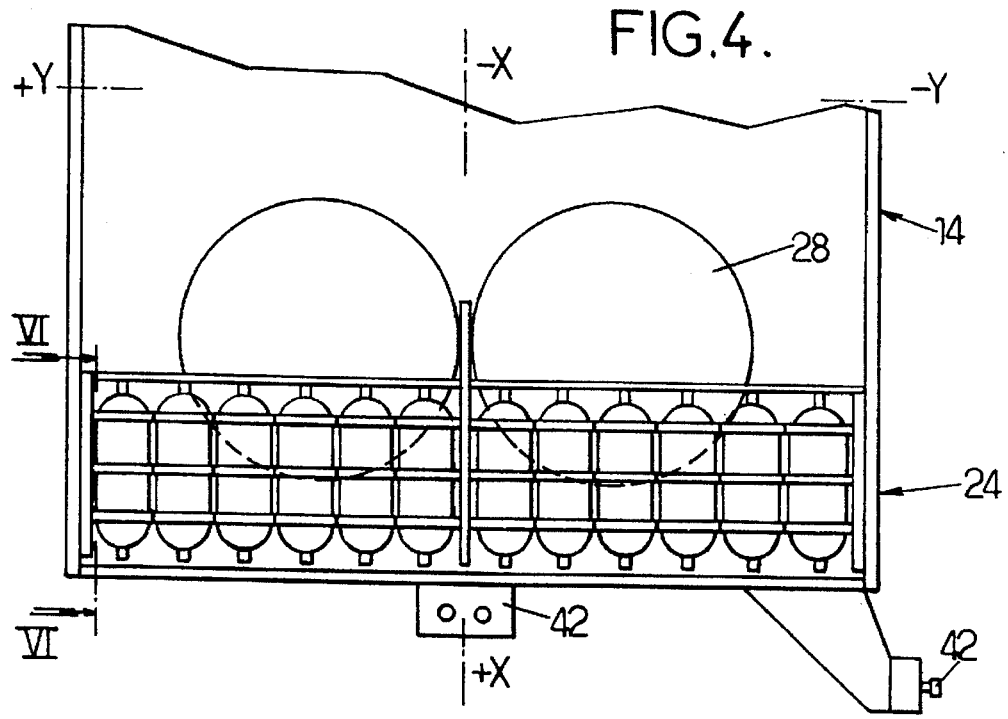
FIG. 4 shows a fraction of a satellite including modules of the kind shown in FIG. 3, seen in direction Z.
Figure 5:
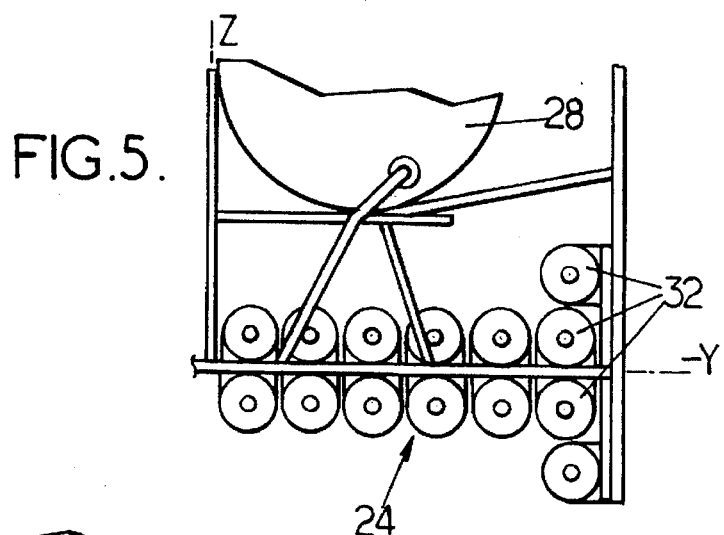
FIG. 5 shows a half module seen in direction X.
Figure 6:
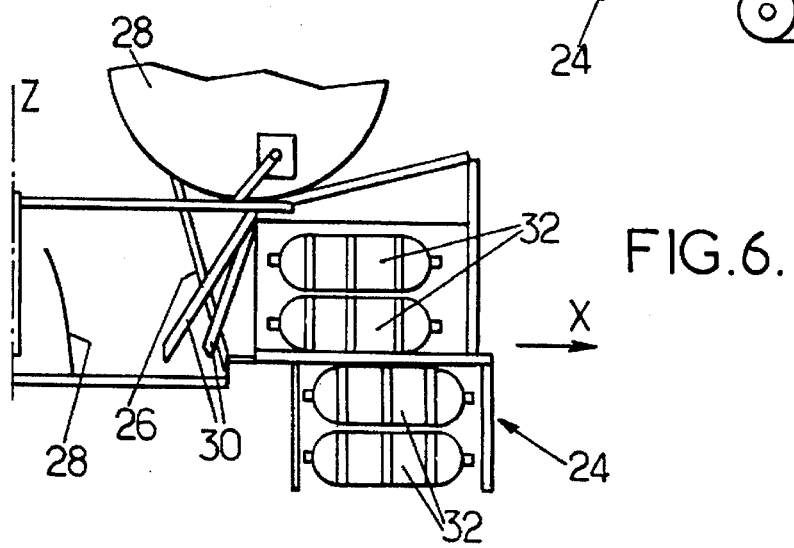
FIG. 6 shows a module and a fraction of the structure of the satellite as seen in direction –Y, i.e. looking along arrows VI—VI of FIG. 4.

As can be seen in FIG. 4, the modules are mounted in such a way that they do not interfere with the installation of station-maintaining nozzles 42.

It can also be seen that each of the modules can be put into place on the satellite after the satellite has already been assembled, and possibly even when the satellite includes its solar generators folded onto each of its walls in a launch configuration. The modules can be installed as long as access to the side of the satellite is available in the −Z direction. All electrical connections can be made by mating a connector carried by a module with a connector carried by the structure of the satellite.

The sides 33 may constitute radiators. Then the sides are made in conventional manner by honeycomb panels carrying a reflecting and radiating coating such as a paint, a mirror, or a film of polytetrafluorethylene or of the polyimide known as "Kapton" having a reflecting metal surface coating.

A heat transfer path must be provided between the walls of the cells and the radiators. This path can be provided in a wide plurality of ways. It may be constituted merely by a braid fixed to the sides when the sides are reflective, and pressed against the walls of the cells. It may also be constituted by one or more heat pipes, connecting reflector-constituting plates together and to the walls of the cells.

Figure 7:
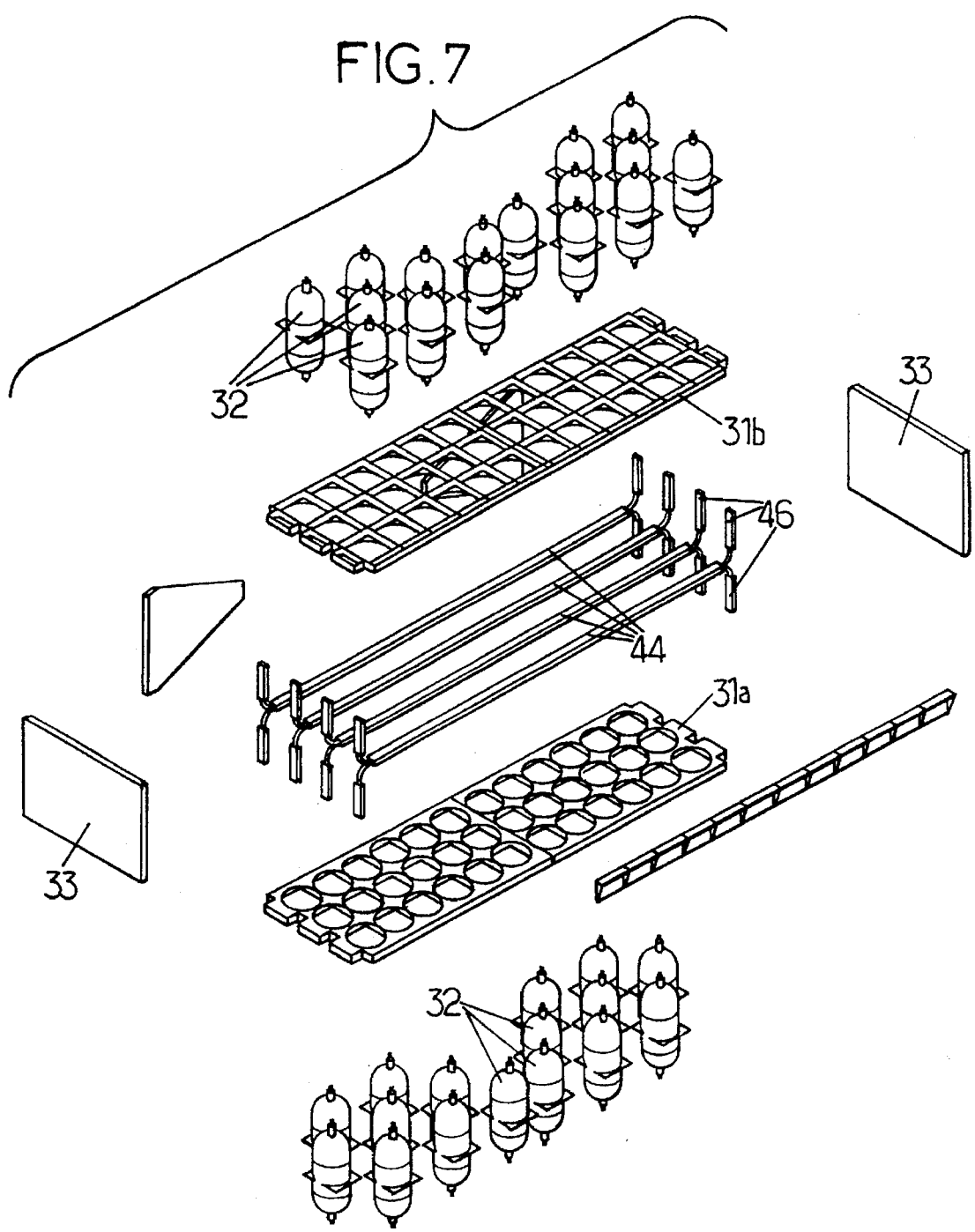
FIG. 7 is similar to FIG. 3 and is an exploded perspective view of a module constituted another embodiment.
Figure 8:
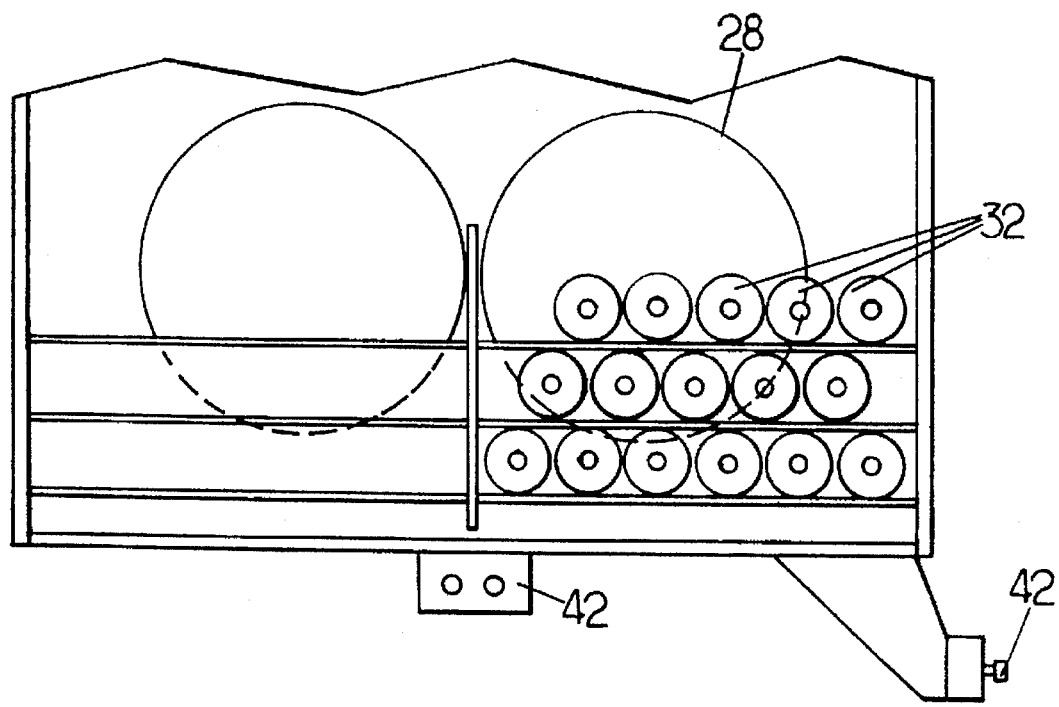
FIGS. 8 and 9, respectively similar to FIGS. 4 and 6, correspond to the embodiments of FIGS. 4 and 6, corresponding to the embodiment of FIG. 7.
Figure 9:
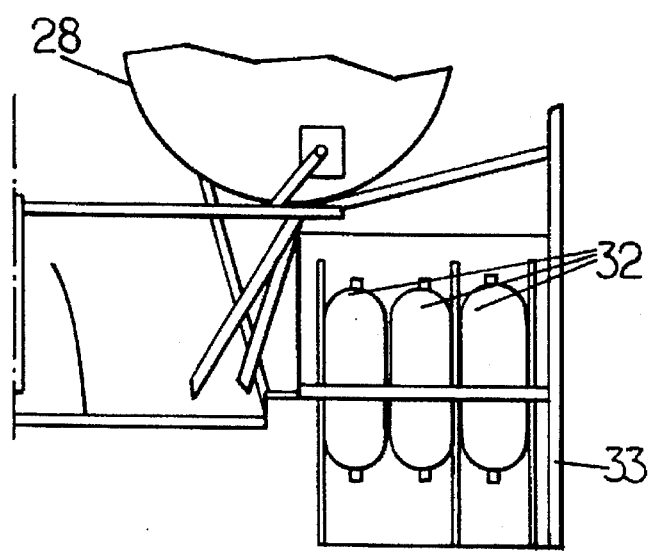

The embodiment shown in FIGS. 7 to 9 (in which elements corresponding to elements in FIGS. 2 to 6 carry the same reference numerals) differs from the preceding embodiment in that the cells are disposed perpendicularly to the base plate of the chassis, and pass through it. The base plate is itself made up of two perforated plates 31a and 31b enabling the cells to be held in place by clamping on to collars that each of them possess. The heat flow path can then be constituted by heat pipes 44 placed between walls which make up the base plate, and extended by couplings 46 which are fixed flat against the inside faces of the sides 33.

The chassis may also be fixed in rigid manner to the structure of the satellite by means of add-on-gussets.

I claim:

1. Earth orbiting three axis stabilized satellite comprising:
   a structure having walls designed to face North and South when the satellite is on station on a geosynchronous orbit, and at least one storage battery unit including:
   a chassis having a base plate oriented North-South when the satellite is on station and having two sides mechanically secured to said base plate to respectively face North and South,
   a plurality of storage cells carried by said chassis, and
   heat conducting means for thermally connecting said sides to each other and to said cells.

2. Satellite according to claim 1, wherein said sides are in alignment with said walls which face North and South and extend away from the Earth from said walls.

3. Satellite according to claim 1, wherein said heat conducting means comprise heat pipes.

4. Satellite according to claim 1, wherein said chassis and said cells constitute a unitary module that can be handled as a block, said sides are provided with means for fixing to said walls which face North and South and said base plate is provided with further means for fixing to a plate belonging to the structure and placed in a plane that contains a North-South direction and an East-West direction.

5. Satellite according to claim 1, wherein said chassis and said structure are provided with means for mutually connecting them which are located and arranged for permitting connection after the satellite is assembled for launch.

6. Satellite according to claim 1, wherein said sides consist of structural walls and separate radiator plates connected thereto and having a radiating coating.

7. Satellite according to claim 1, wherein two said storage battery units are provided, symetrically with respect to a midplane of said structure.

8. Satellite according to claim 1, wherein each of said storage cells has a generally cylindrical shape, is located orthogonally and across said base plate and is received thereto.

9. Earth orbiting three axis stabilized satellite comprising:
   a structure having walls designed to face North and South when the satteltie is on station on a geosynchronous orbit, and having a structural plate placed in a plane which contains a North-South direction and an East-West direction, and
   at least one storage battery unit constituting a unitary module for handling as a block, said storage battery unit including:
   a chassis having a base plate oriented North-South when the satellite is on station, extending across an entire width of said structure and having two sides mechanically secured to said base plate orthogonally thereto, so as to respectively face North and South,
   means for detachably fixing said sides to said walls and for detachably fixing said base plate to said structural plate, a plurality of storage cells carried by said chassis and fixed only to said chassis, and heat conducting means for thermally connecting said sides to each other and to said cells.

10. Satellite according to claim 9, wherein said sides are in alignment with said walls and extend away from the earth from said walls.

11. Satellite according to claim 9, wherein said cells are substantially cylindrical and located side-by-side, some of said cells are fixed against one surface of said base plate, others are fixed against an opposed surface of said base plate and the remainder of said cells are fixed against an inside surface of said sides.

* * * * *